(12) United States Patent
Seidel et al.

(10) Patent No.: US 10,599,936 B2
(45) Date of Patent: Mar. 24, 2020

(54) METHOD FOR CORRECTING THE DISTORTION OF A FIRST IMAGING OPTICAL UNIT OF A FIRST MEASUREMENT SYSTEM

(71) Applicant: Carl Zeiss SMT GmbH, Oberkochen (DE)

(72) Inventors: Dirk Seidel, Jena (DE); Carsten Schmidt, Jena (DE); Michael Himmelhaus, Berlin (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 54 days.

(21) Appl. No.: 16/040,767

(22) Filed: Jul. 20, 2018

(65) Prior Publication Data

US 2019/0026578 A1    Jan. 24, 2019

(30) Foreign Application Priority Data

Jul. 21, 2017 (DE) .......... 10 2017 116 495

(51) Int. Cl.
*G06K 9/03* (2006.01)
*G06T 5/00* (2006.01)
(Continued)

(52) U.S. Cl.
CPC .............. *G06K 9/03* (2013.01); *G06K 9/209* (2013.01); *G06T 5/006* (2013.01); *G06T 7/0004* (2013.01); *G06T 7/55* (2017.01); *G06T 7/70* (2017.01)

(58) Field of Classification Search
CPC .......... G06K 9/03; G06K 9/209; G06T 5/006; G06T 7/0004; G06T 7/70; G06T 7/55
See application file for complete search history.

(56) References Cited

U.S. PATENT DOCUMENTS 5,937,105 A * 8/1999 Katayama ................ G06K 9/03
382/293
6,668,075 B1 * 12/2003 Nakamura ............ G06T 7/0006
348/95
(Continued)

FOREIGN PATENT DOCUMENTS

DE      695 21 739      5/2002 ............. G06T 15/10
DE      103 32 161      2/2005 ............... G06T 7/00
(Continued)

OTHER PUBLICATIONS

Aicon 3D Systems GmbH, "Directions for the calibration of cameras with an AICON target panel" (Oct. 2001).
(Continued)

*Primary Examiner* — Asghar H Bilgrami
(74) *Attorney, Agent, or Firm* — Fish & Richardson P.C.

(57) ABSTRACT

A method for correcting the distortion of a first imaging optical unit of a first measurement system is provided, wherein the first imaging optical unit has a first measurement accuracy and the method comprises the steps of:
a) providing a first sample with first marks,
b) measuring the positions of the first marks by use of a second measurement system comprising a second imaging optical unit, which has a second measurement accuracy that is better than the first measurement accuracy,
c) establishing on the basis of the positions measured in step b) and predetermined intended positions of the first marks position errors of the first marks on the first sample produced during the manufacture of the first sample,
d) measuring the positions of the first marks by use of the first measurement system,
e) establishing the measurement error of the first imaging optical unit when determining the position of each first
(Continued)

mark on the basis of the positions measured in step d), the position errors established in step c) and the predetermined intended positions of the first marks, and f) taking account of the measurement error established in step e) for correcting the distortion in the case of a further measurement with the first measurement system.

20 Claims, 3 Drawing Sheets

(51) Int. Cl.
  *G06T 7/00* (2017.01)
  *G06K 9/20* (2006.01)
  *G06T 7/70* (2017.01)
  *G06T 7/55* (2017.01)

(56) References Cited

U.S. PATENT DOCUMENTS

| | | |
|---|---|---|
| 7,529,424 B2 | 5/2009 | Ahiska |
| 2006/0191131 A1* | 8/2006 | Takanami ......... H01L 21/67144 29/743 |
| 2012/0121205 A1 | 5/2012 | Arnz et al. |
| 2014/0307949 A1 | 10/2014 | Eyring et al. |
| 2015/0042969 A1* | 2/2015 | Morikuni ............. G03F 9/7023 355/55 |
| 2017/0091921 A1 | 3/2017 | Seidel |

FOREIGN PATENT DOCUMENTS

| | | | |
|---|---|---|---|
| DE | 102006055758 | 5/2008 | ............. G01B 11/24 |
| DE | 102009035290 | 2/2011 | ............. G03F 9/00 |
| DE | 102015218917 | 3/2017 | ............. G03F 9/00 |

OTHER PUBLICATIONS

ITRS (International Technology Roadmap for Semiconductors): "http://www.itrs2.net" (Downloaded on Jul. 26, 2018).

Laengle et al., "Pattern Placement Metrology Using PROVE™ High Precision Optics combined with Advanced Correction Algorithms", *Proceedings of SPIE*, vol. 8082, Optical Measurement Systems for Industrial Inspection VII, 80820J (May 26, 2011).

* cited by examiner

METHOD FOR CORRECTING THE DISTORTION OF A FIRST IMAGING OPTICAL UNIT OF A FIRST MEASUREMENT SYSTEM

CROSS-REFERENCE TO RELATED APPLICATION

This application claims priority to German application 10 2017 116 495.2, filed on Jul. 21, 2017, the entire contents of which are herein incorporated by reference.

TECHNICAL FIELD

The present invention relates to a method for correcting the distortion of a first imaging optical unit of a first measurement system.

BACKGROUND

By way of example, the first measurement system can have an optical photomask inspection system or an optical metrology system for photomasks. In such measurement systems, the first imaging optical unit exhibits a distortion of the imaged image field. Consequently, the positions and distances of the imaged image field are erroneous in relation to the positions and distances actually present on the imaged sample. This error, which is purely caused by the first imaging optical unit, can be a multiple of the measurement accuracy to be measured in the image field, even in the case of a modern first measurement system.

Thus, for example, the distortion error of a modern metrology system can be 30 nm on the photomask to be imaged, whereas the measurement accuracy of the metrology system would have to be less than 1 nm in relation to the photomask, for example for measuring marks and distances of marks on the photomask in the image field.

According to the prior art, a conventional method for correcting the distortion of an optical system consists of imaging an ideal, i.e., error-free, test structure with the aid of the optical system and then determining the distortion error by way of the comparison between test structure and image. These can then be used to correct within the meaning of a higher measurement accuracy further images recorded with the aid of the optical system.

However, on account of the extreme requirements on the measurement accuracy, it is very difficult in the present case, i.e., the correction of distortion of optical systems used in microlithography, to manufacture error-free test structures. Here, "error-free" means test structures with deviations of structure positions from the intended value that are significantly lower than the required measurement accuracy of the measurement system. Consequently, a correction of these optical systems according to the prior art is very difficult.

SUMMARY

Proceeding therefrom, in a general aspect, the present invention provides a method for correcting the distortion of a first imaging optical unit of a first measurement system, by means of which the difficulties described at the outset can be overcome as completely as possible.

The method according to the invention for correcting the distortion of a first imaging optical unit of a first measurement system, wherein the first imaging optical unit has a first measurement accuracy, may comprise the following steps:

a) providing a first sample with first marks, b) measuring the positions of the first marks by use of a second measurement system comprising a second imaging optical unit, which has a second measurement accuracy that is better than the first measurement accuracy, c) establishing on the basis of the positions measured in step b) and predetermined intended positions of the first marks position errors of the first marks on the first sample produced during the manufacture of the first sample, d) measuring the positions of the first marks by use of the first measurement system, e) establishing the measurement error of the first imaging optical unit when determining the position of each first mark on the basis of the positions measured in step d), the position errors established in step c) and the predetermined intended positions of the first marks of the first sample, and f) taking account of the measurement error established in step e) for correcting the distortion in the case of a further measurement with the first measurement system.

Consequently, the higher measurement accuracy of the second measurement system (which is at least one order of magnitude better, for example) is used advantageously in the method according to the invention in order to determine the actual positions of the first marks on the first mask with the second measurement accuracy. Then, this is advantageously used when measuring the first sample in the first measurement system to establish the measurement error of the first imaging optical unit of the second measurement accuracy, wherein this measurement error then no longer depends on the first sample and consequently can be used in further measurements by the first measurement system on further samples to carry out a highly accurate measurement (e.g., determining the position or determining distances).

The first measurement system can have a first image sensor with image pixels, wherein a measurement error value is established for each image pixel in step e). This can then be taken into account in step f) such that a fast distortion correction is possible in the case of further measurements with the first measurement system.

The first sample provided in step a) can be embodied in such a way that the first marks are arranged in a regular grid (preferably in a two-dimensional grid). Here, the first marks can all be the same. It is also possible that at least one of the first marks has a different orientation than the remaining first marks (e.g., at the corresponding position in the grid but positioned in a rotated manner if the first marks per se are not rotationally symmetric). Further, at least one of the first marks can have a different form. The form and/or orientation of the at least one other first mark is preferably chosen in such a way that it, in conjunction with the other first marks, leads to the arrangement of the first marks not having translational invariance.

Naturally, the first sample can also be embodied in such a way that the first marks are not arranged in a regular grid. The first marks can have the same embodiment or different embodiments.

Preferably, all first marks can be imaged simultaneously in the measurement in step b). Consequently, the first sample need not be moved or displaced during the measurement to allow all first marks to be recorded. Advantageously, this leads to an improved measurement accuracy.

Similarly, all first marks can be imaged simultaneously for the measurement in step d). This leads to an improved correction of the distortion of the first measurement system, particularly if the first measurement system has a lower measurement accuracy than the second measurement system. By way of example, the measurement accuracy of the first measurement system can be significantly lower than that of the second measurement system on account of non-optical influences (e.g., mechanics, electronics, atmosphere, temperature). Then, a sequential measurement of all (first) marks would carry the signature of these non-optical influences and consequently not allow an ideal distortion correction. If all marks are measured simultaneously, however, the non-optical influences can be (largely) switched off and this allows a much improved distortion correction to be obtained, said distortion correction coming very close to that of the second measurement system used to measure the first marks. This renders the method described here of interest, in particular, to measurement systems with high demands on the optical imaging but only moderate demands on the non-optical components of the measurement system.

Further, the measurement in step b) and/or the measurement in step d) can be carried out repeatedly in succession. In this case, averages of the plurality of measurements are preferably established. This, too, increases the measurement accuracy.

In the method according to the invention, after carrying out step f), steps d) and e) can be carried out again in order to establish the measurement errors of the first imaging optical unit. Consequently, there can be another calibration. This may become necessary, for example, if the first imaging optical unit was modified or if the measurement accuracy of the first measurement system becomes too large over time.

Further, after carrying out step e), the following steps can be carried out in the method according to the invention:

g) measuring the positions of second marks of a second sample by use of the first measurement system and h) establishing on the basis of the positions of the second marks measured in step g), the measurement error established in step e) and predetermined intended positions of the second marks of the second sample position errors of the second marks on the second sample produced during the manufacture of the second sample.

In this way, the position errors of the second marks of the second sample can be established by use of the first measurement system with the measurement accuracy of the second measurement system, without, however, the second measurement system being required. As a result of this procedure, the measurement accuracy is, as it were, related to the second sample.

Therefore, the measurement error of the first imaging optical unit can be established again on the basis of the second sample, and so the first sample is no longer required and can be spared as a result thereof, for example.

In order to establish the measurement error of the first imaging optical unit again, it is possible to carry out the following steps:

i) measuring the positions of the second marks of the second sample by use of the first measurement system and j) establishing the measurement error of the first imaging optical unit when determining the position of each second mark on the basis of the positions measured in step i), the position errors established in step h) and the predetermined intended positions of the second marks.

Further, a system is provided, said system comprising the first and second measurement systems and being able to be used to carry out the above-described steps of the method according to the invention (including its developments). In particular, the system can have a central data processing unit, which carries out steps c) and e), for example. Naturally, the system can also be embodied in such a way that step c) is carried out in a data processing unit (e.g., controller) of the second measurement system and step e) is carried out in a data processing unit (e.g., controller) of the first measurement system.

Further, a first measurement system is provided, said first measurement system being able to carry out the steps d)-f) (and optionally further steps of developments of the method according to the invention).

Further, a computer program product is provided, said computer program having software code to carry out the steps of the method according to the invention (including its developments). The computer program product can be executed on a data processing unit. By way of example, the latter can be the central data processing unit. It is also possible that the computer program product is executed on different data processing units, which are linked to one another. This allows individual steps of the computer program product to be executed on different data processing units.

It goes without saying that the aforementioned features and those yet to be explained below can be used not only in the combinations specified but also in other combinations or on their own, without departing from the scope of the present invention.

The invention will be explained in more detail below on the basis of exemplary embodiments, with reference being made to the attached drawings, which likewise disclose features essential to the invention. These exemplary embodiments serve merely for illustration and should not be interpreted as restrictive. By way of example, a description of an exemplary embodiment with a multiplicity of elements or components should not be interpreted to the effect that all these elements or components are necessary for implementation purposes. Rather, other exemplary embodiments also may contain alternative elements and components, fewer elements or components or additional elements or components. Elements or components of different exemplary embodiments can be combined with one another, unless indicated otherwise. Modifications and developments which are described for one of the exemplary embodiments may also be applicable to other exemplary embodiments. In order to avoid repetition, the same elements or corresponding elements in the various figures are denoted by the same reference sign and are not explained a number of times. In the figures:

DETAILED DESCRIPTION

Figure 1:
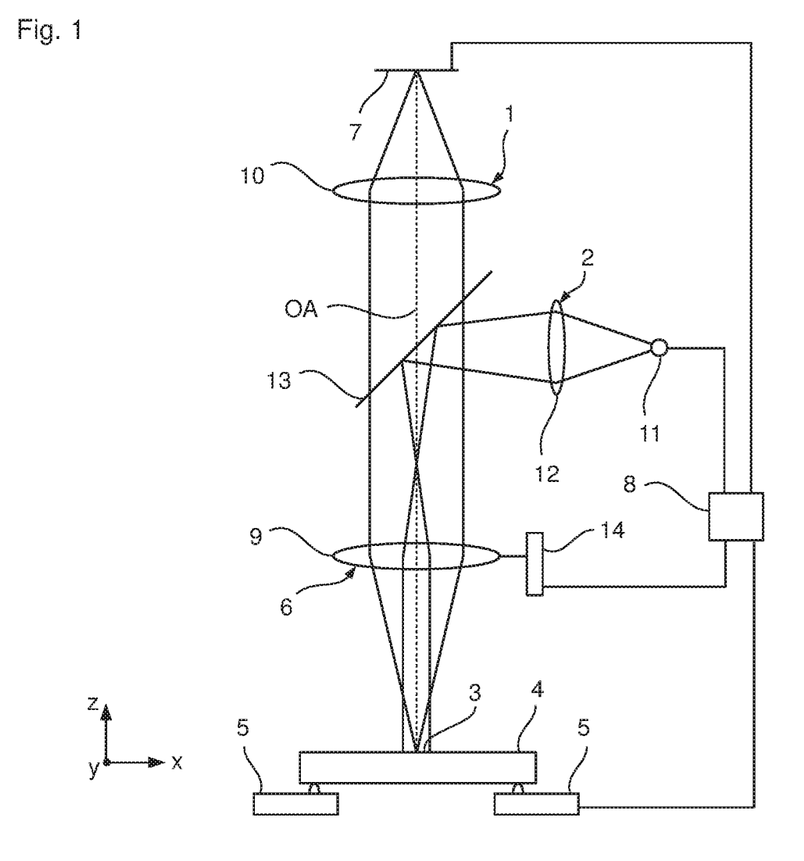
FIG. 1 shows a schematic view of a first optical measurement system.

In the exemplary embodiment shown in FIG. 1, the first optical measurement system 1 according to the invention, which may be embodied as a photomask inspection system or metrology system, for example, comprises a first illumination unit 2 for illuminating an image field 3 of a sample 4, a first sample stage 5 for holding the sample 4, a first imaging optical unit 6 for magnified imaging of the illuminated image field 3 onto a first image sensor 7, which may be a CCD sensor or a CMOS sensor, for example, and a first controller 8.

The first imaging optical unit 6 illustrated in FIG. 1 comprises a first lens 9 and a first tube optical unit 10 for imaging the illuminated image field 3 onto the first image sensor 7.

The first illumination unit 2 comprises a first light source 11, a first collector optical unit 12 disposed downstream of the first light source 11, a beam splitter 13 that is arranged between the first lens 9 and the first tube optical unit 10, and the first lens 9. The light of the first light source 11 is focused by means of the first collector optical unit 12 and coupled into the beam path between the first lens 9 and the first tube optical unit 10 by use of the beam splitter 13 in such a way that the first lens 9, as a condenser for the illumination optical unit 2, ensures that the image field 3 is illuminated with beams that are parallel as far as possible. By way of example, the first light source 11 can have a halogen lamp, a xenon discharge lamp, an LED or a laser.

Further, the first optical measurement system 1 comprises a first z-drive 14, by means of which the first lens 9 can be moved along the z-direction in order to carry out desired focusing. Naturally, the first optical measurement system 1 can also be embodied in such a way that the first sample stage 5 is movable in the z-direction or that both the first lens 9 and the first sample stage 5 are movable in the z-direction.

For the purposes of controlling the first optical measurement system 1, the first controller 8 is connected to the first image sensor 7, the first light source 11, the first z-drive 14 and the first sample stage 5.

Figure 2:
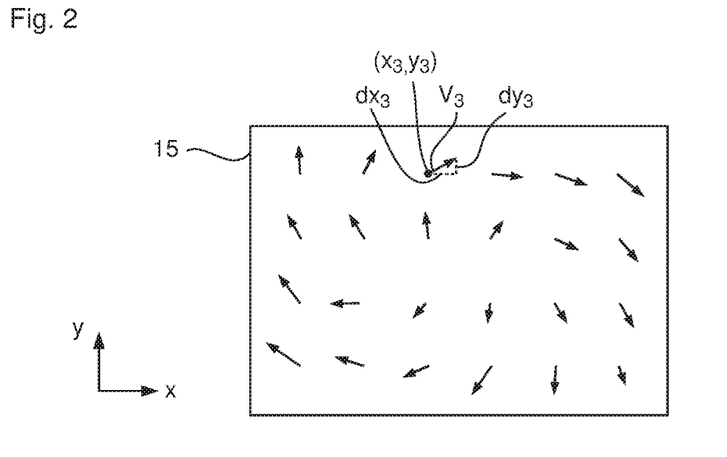
FIG. 2 shows a schematic illustration of the recorded image field 3 for explaining the occurring distortions.

In FIG. 2, the distortion that occurs as a result of the first imaging optical unit 6 when imaging the image field 3 onto the first image sensor 7 is illustrated schematically in a magnified illustration 15 of the recorded image field 3. The distortion is elucidated by the plotted arrows, wherein the length of the arrows denotes the size of the displacement and the direction of the arrows denotes the direction of the displacement which a point in the image field 3 experiences when imaged on the first image sensor 7. As can be gathered from FIG. 2, the size and the direction of the displacement depends on the position in the image field. By way of example, the image field in this case can have an extent of 10 to 50 μm in the x-direction and an extent of 15 to 80 μm in the y-direction. In relation to the image field 3, the maximum occurring displacement may be in the region of 30 to 35 nm. This means that a point in the image field will then be recorded in the recording with a displacement of up to 30 to 35 nm from its actual position. Consequently, the measurement accuracy of the first measurement system 1 is 30 to 35 nm (in relation to the image field 3). However, a measurement accuracy of 1 nm or less is demanded by now, precisely when recording photomasks (i.e., if the sample 4 is a photomask to be examined, which is used in semiconductor production). In order to arrive at such a measurement accuracy with the first optical measurement system 1, it is possible to carry out the distortion correction set forth below.

Figure 3:
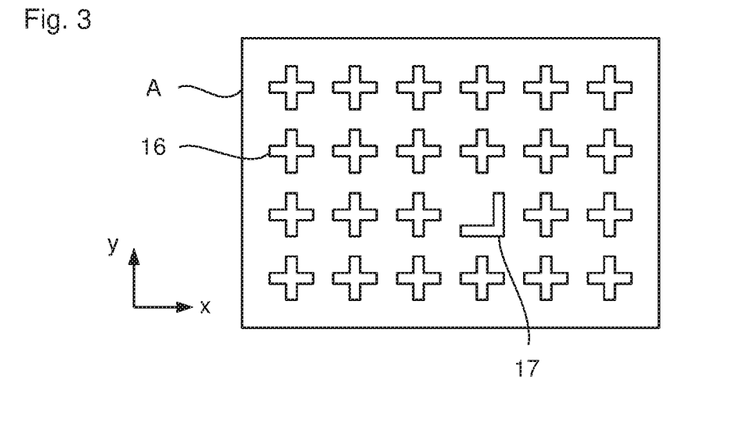
FIG. 3 shows a schematic illustration of the mask A.

A test sample A (which can also be referred to as mask A) with a plurality of first marks 16, which, by way of example, have the form of a plus sign here, is provided, with the first marks 16 being arranged in a regular grid. Here, the distances between the individual marks 16 are chosen to be the same in the x-direction and in the y-direction. Moreover, a second mark 17 with an L-shape is provided in the third line and fourth column here, instead of the first mark 16. However, this is not mandatory. The test sample A can also be embodied in such a way that only first marks 16 are arranged in a regular grid. The regular arrangement in a grid is not necessary either; irregular distances may also be present. The marks 16, 17 may also have different embodiments.

Preferably, the test sample A is at least as large as the image field 3 of the first optical measurement system 1.

In the illustration of FIG. 3, which is purely schematic, the assumption is made that an ideal production process is present for the test sample A and consequently the marks 16, 17 are embodied at precisely the desired intended positions. However, this is not the case in a real produced test sample A. Thus, position errors (which can also be referred to as write errors) of the individual marks 16, 17 may occur by all means, said position errors having a size of several nm and consequently being greater than the desired measurement accuracy of the first optical measurement system 1. Therefore, the test sample A is initially measured in a second optical measurement system 21, illustrated schematically in FIG. 4, which is able to measure position errors of less than or equal to 1 nm or which has such a measurement accuracy.

The basic structure of the second optical measurement system 21 is similar to the optical structure of the first optical measurement system 1. In order to be able to display a better distinguishability between the two optical measurement systems 21 and 1 in the schematic illustrations of FIG. 1 and FIG. 4, the second optical measurement system 21 is embodied with a second illumination unit 22, which is a transmitted light illumination unit. However, it is possible for the second optical measurement system 21 to have a reflected light illumination unit. Similarly, the first optical measurement system 1 can have a transmitted light illumination unit.

Figure 4:
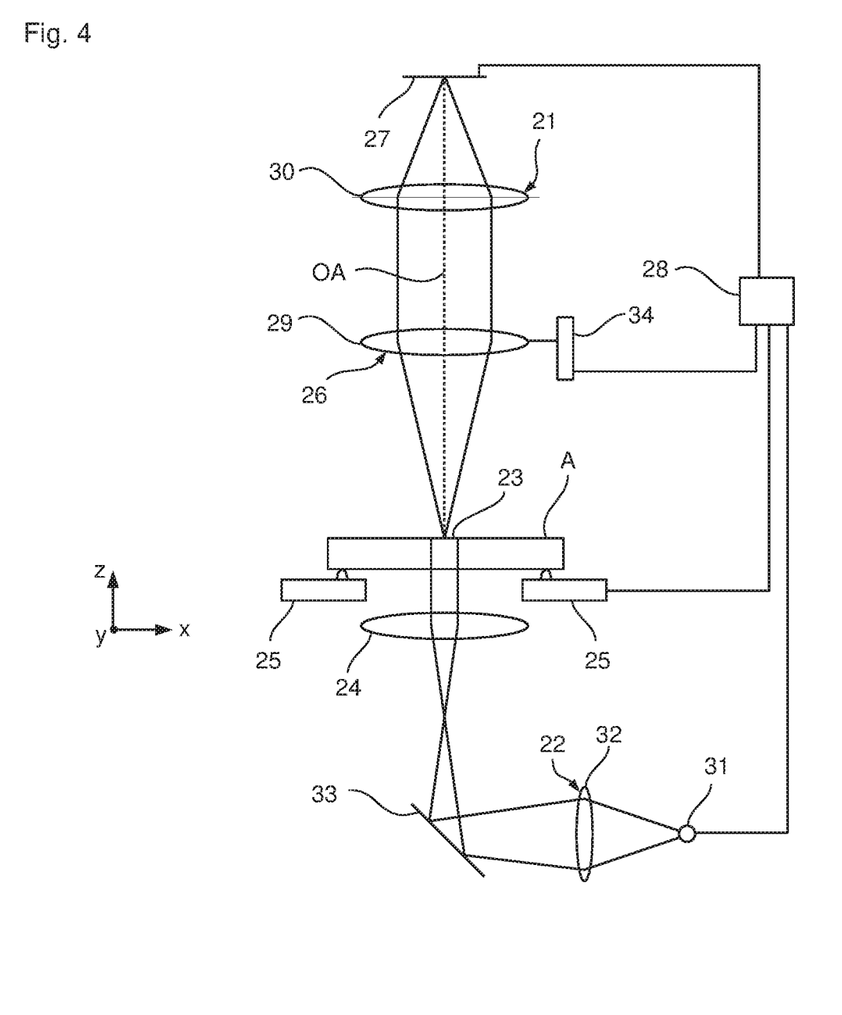
FIG. 4 shows a schematic illustration of the second measurement system.

The second optical measurement system 21 comprises a second sample stage 25 for holding a sample (e.g., the test sample A), a second imaging optical unit 26, a second image sensor 27 and a second controller 28.

The second imaging optical unit 26 comprises a second lens 29 and a second tube optical unit 30. The second illumination unit 22 comprises a second light source 31, a second collector optical unit 32, a deflection mirror 33 and a second condenser 24.

Using the second illumination unit 22, the second image field 23 of the second imaging optical unit 26 is illuminated as uniformly as possible with preferably parallel beams. The second imaging optical unit 26 images the image field and consequently the marks 16, 17 of the test sample A onto the second image sensor 27. Preferably, the second image field 23 is at least as large as the first image field 3 of the first optical measurement system 1 or as the first test sample A (or as the region covered by the marks 16, 17). If this is the case, there is advantageously no need to carry out a displacement of the second sample stage 25 in order to completely carry out the desired measurement. The measurement of the test sample A is preferably carried out in such a way that each individual mark 16, 17 is measured. The write error $\varepsilon_i^A$ for the n marks 16, 17 on the mask A (with i=1, . . . , n) then emerge from the difference between the measured positions $P_i^A = \{p_x^A; p_y^A\}_i$ and the intended positions (=design positions) $D_i^A = \{d_x^A; d_y^A\}_i$ of the respective mark 16, 17 during the measurement carried out by use of the second optical measurement system 21 as follows:

$$\varepsilon_i^A = P_i^A - D_i^A$$

Here, the assumption is made that the measured positions $P_i^A$ have already been corrected for distortion in respect of the second imaging optical unit 26. As a result of this measurement, the position errors $\varepsilon_i^A$ are known for each mark 16, 17 and consequently, in conjunction with the intended positions of the marks 16, 17 known in advance, the absolute position of each mark 16, 17 on the mask A is known with the measurement accuracy of the second optical measurement system 21.

The measurement of the mask A in the second optical measurement system 21 can be carried out multiple times and the results can be averaged.

Next, the mask A is positioned in the first optical measurement system 1 in such a way that the marks 16, 17 lie in the first image field 3 or fill the first image field 3. Moreover, the established position errors $\varepsilon_i^A$ are supplied to the first controller 8. The first optical measurement system 1 then measures the positions $R_i^A$ ($R_i^A = \{r_x^A; r_y^A\}_i$) of the marks 16, 17 of the mask A in the first image field 3 of the first optical measurement system 1, wherein, preferably, the first sample stage 5 is not displaced during the measurement (as a displacement increases the measurement inaccuracy). The measurement in the first optical measurement system 1, too, can be carried out multiple times and the results can be averaged.

Then, taking account of the intended positions $D_i^A$ and the write errors $\varepsilon_i^A$ of the marks 16, 17 measured by use of the second optical measurement system 21, the measurement error $V_i$ can be calculated as follows:

$$V_i = R_i^A - D_i^A - \varepsilon_i^A$$

The measurement error $V_i = (dx; dy)_i$ thus determined is no longer dependent on the mask A and only still contains the distortion of the first imaging optical unit 6 of the first optical measurement system 1 to be corrected. In FIG. 2, this is plotted for the sampling point i=3 and the measurement error $V_3$. For the point $x_3$, $y_3$, the measurement error is $dx_3$ and $dy_3$.

It is expedient to combine all distortion errors and corresponding sampling points of the individual markers i=1, ..., n in a vector V:

$$\underline{V} = \begin{Bmatrix} (x_1, y_1, dx_1, dy_1) \\ (x_2, y_2, dx_2, dy_2) \\ \vdots \\ (x_n, y_n, dx_n, dy_n) \end{Bmatrix}$$

Such a vector or data record can easily be interpolated onto a different sampling point grid using conventional methods. This data record or this interpolated data record can be stored in the controller 8 of the first optical measurement system 1 and can be taken into account in subsequent measurements of further samples in order to correct the distortion of the first optical imaging optical unit 6.

It can be advantageous to determine the distortion pattern for each recordable point of the first image field 3 of the first optical measurement system 1 (and consequently for each image pixel of the first image sensor 7, for example) and store this in the first controller 8 of the first optical measurement system 1. As a result, the interpolation of the distortion corrections for all n sampling points onto the position of the image pixels only has to be carried out once. Then, the distortion of a measurement image of the first optical measurement system 1 is corrected by way of a suitable interpolation of the image intensity at a pixel position that is displaced by the distortion presented by the corresponding pixels.

Further, it can be advantageous to determine the distortion pattern V for a first image field 3 that is larger than the first image field actually used during the measurement with the first optical measurement system 1. Consequently, the first image field 3 is larger during the described establishment of the distortion pattern V than during the measurement with the first optical measurement system 1, in which a distortion correction is then carried out on the basis of the distortion pattern V. As a result, it is possible to avoid extrapolation errors of the distortion correction at the edge of the first image field 3 since the sampling points (position of the marks 16, 17) cannot lie arbitrarily close to the image field edge for a correct evaluation in the measurement region of the first optical measurement system 1. The described distortion correction can also be referred to as an image field calibration of the first optical measurement system 1.

Should the distortion of the first optical measurement system 1 be measured again at a later time (or if the image field calibration should be carried out again), for example if there have been changes to the first imaging optical unit 6 or first image sensor 7, the method steps for measuring the mask A and carrying out a subsequent evaluation, described in conjunction with the first optical measurement system 1, can be carried out again. Consequently, the positions $R_i^A$ are measured again and the measurement error $V_i$ of the modified optical system 6, 7 of the first optical measurement system 1 can be determined on the basis of the unchanged values of the intended positions $D_i^A$ and the write errors $\varepsilon_i^A$.

Figure 5:
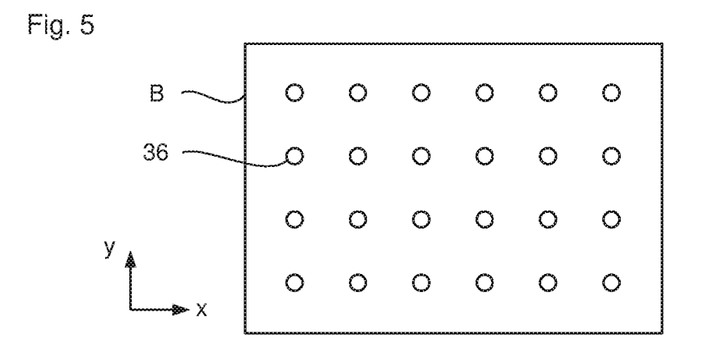
FIG. 5 shows a schematic illustration of the mask B.

Since mask A is unique (and therefore also can be referred to as golden mask A) and measured once in the second optical measurement system 21, it should be used and transported as little as possible in order to exclude damage or deterioration. Further, it may be possible that mask A currently is used at another first optical measurement system 1, and so it may be the case that mask A is not available at all times. Therefore, a further mask B (which can also be referred to as silver mask B) can be provided for correcting distortions according to one development according to the invention, said further mask being able to remain at the first optical measurement system 1 and being able to be used there at all times for a renewed determination of the distortion. In principle, the mask B can have the same embodiment as the mask A. However, it can also have a different arrangement and/or form of marks. FIG. 5 shows an example of the mask B, in which contact holes 36 (which are illustrated as circles) arranged in a grid are formed.

In order to be able to use the mask B for a renewed determination of the distortion in the first optical measurement system 1, the described method for correcting distortions is extended as set forth below. Once the measurement error V has been determined as described above using the mask A, the mask B is inserted into the first optical measurement system 1 and positioned in such a way that the marks 36 of the mask B fill the first image field 3, preferably as completely as possible. It is advantageous if the mask B has marks 36 at the same locations as mask A.

Then, the positions of the marks 36 of the mask B in the first image field 3 of the first optical measurement system 1 are measured by use of the first optical measurement system 1 at the design positions $D_i^B$ of the mask B, leading to the result $R_i^B = \{r_x^B; r_y^B\}_i$. Correcting $R_i^B$ with the design positions $D_i^B$ and the previously determined distortion error $V_i$ of the first optical measurement system 1 leads to the write error $\varepsilon_i^B$ of the marks 36 on the mask B be established:

$$\varepsilon_i^B = R_i^B - D_i^B - V_i$$

Consequently, the write error $\varepsilon_i^B$ is measured in the first optical measurement system 1 with the measurement accuracy of the second optical measurement system 21, without using the second optical measurement system 21. The write error $\varepsilon_i^B$ is stored in the first controller 8 and the mask B is stored in such a way that it can be inserted into the first optical measurement system 1 again and be measured by the latter. Since the write error $\varepsilon_i^B$ of the mask B is now known with the desired high accuracy (less than or equal to 1 nm), it is possible at all times, provided this is desired or necessary, to establish the distortion error $V_i$ by a renewed measurement of the positions $R_i^B$ of the marks 36 of the mask B and taking account of the known intended positions $D_i^B$, as follows:

$$V_i = R_i^B - D_i^B - \varepsilon_i^B$$

This write error $V_i$ is then stored in the first controller 8 and used in future measurements of the first optical measurement system 1 for distortion correction purposes.

Examinations have shown that the optical measurement system 1 thus calibrated can be used, for example, to examine defects in an array of contact holes on a MoSi mask. To this end, an intensity difference image, for example, is produced from a measurement image and a reference image. If the measurement image is produced by use of the first optical measurement system 1 but without the above-described distortion correction, it is possible to identify significant systematic deviations in the intensity difference image, for example in the lower left and upper right corners of the image field, comparable to the distortions illustrated in FIG. 2. If the measurement image is produced by use of the first optical measurement system 1 taking account of the described distortion correction, deviations that are homogeneously distributed in the image field are identified in the intensity difference image, said deviations moreover being significantly smaller in terms of magnitude than in the case without the distortion correction. Hence, a better correspondence is obtained between the measurement image and the reference image (which can be a simulated reference image, for example), allowing the clear detection of local intensity disturbances in the measurement image, for example as a consequence of a mask defect during the production of the MoSi mask. Naturally, as known to a person skilled in the art, such measurements can also be carried out using so-called image stacks, in which measurements are carried out at different focal positions in order to find recordings with the best focus. In this case, naturally, a reference image stack is also used for comparison purposes.

In the described exemplary embodiments, the necessary data processing was carried out in the controllers 8 and 28, respectively, of the measurement systems 1, 21. However, it is also possible that the necessary data processing is carried out, at least in part, in a separate data processing unit that is linked to the corresponding controller 8, 28. The separate data processing unit can also be linked to both controllers 8 and 28 and consequently be a central data processing unit, which is provided for both measurement systems 1, 21. The central data processing unit can also be provided for further measurement systems.

By the provision of the mark 17 in the mask A, the translational invariance of the mask A is broken. This may be advantageous during the necessary data processing of the recorded images. By way of example, this facilitates a simple unique assignment of the marks 16, 17 in the recordings of the corresponding mask A to the two measurement systems 1 and 21.

Figure 6:
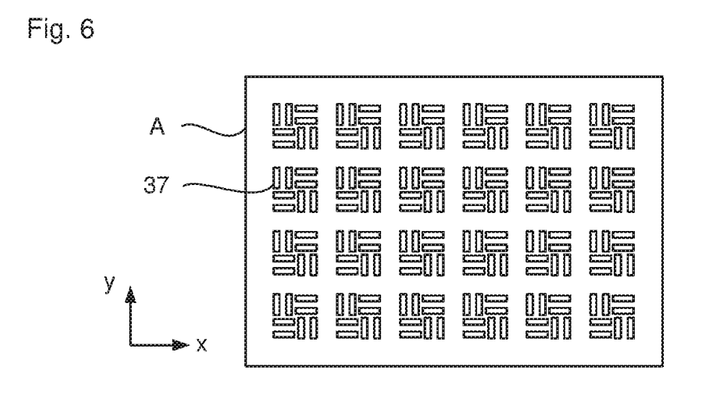
FIG. 6 shows a schematic illustration of a further mask A, B.

FIG. 6 shows another embodiment of the marks in a mask A. In this embodiment, the individual marks 37 are so-called tessellated marks.

Figure 7:
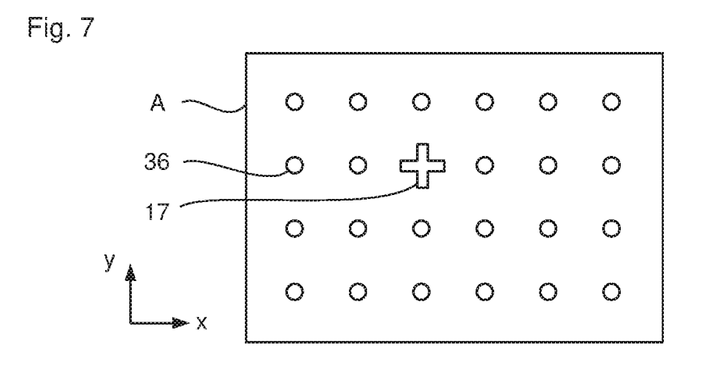
FIG. 7 shows a schematic illustration of a further mask A, B.

FIG. 7 shows an example in which contact holes 36 are arranged in a grid in the same way as in FIG. 5. In order to break the translational invariance, one contact hole 36 has been replaced by mark 17 in the shape of a cross The spacing of the marks 16, 17, 36, 37 in the corresponding mask A, B is chosen, in particular, in such a way that it corresponds to the desired sampling point spacing of the distortion of the first optical measurement system 1. Using suitable methods, any desired sampling point distance can be calculated therefrom by interpolation. In the case of suitable grids of markers 16, 17, 36, 37, the number of sampling points can be doubled if the structures are evaluated in analog fashion with a tonal range inverse to the markers 16, 17, 36, 37.

The mask structures shown in FIGS. 3 and 5 to 7 can be used for mask A and/or for mask B.

In some implementations, a computing system (e.g., the controller 8 or 28) can process data in order to determine the position errors, the measurement errors, and the correction of distortions in further measurements described above. The computing system can include one or more processors and one or more computer-readable media (e.g., ROM, DRAM, SRAM, SDRAM, hard disk, optical disk, and flash memory). The one or more processors can perform various computations described above. The computations can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire, fiber optics and free space. The memory can include any type of memory, such as ROM, DRAM, SRAM, SDRAM, and flash memory.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., general purpose microprocessors, special purpose microprocessors, digital signal processors, single-core or multi-core processors, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM, DVD-ROM, and Blu-ray BD-ROM disks. The processor and the memory can be supplemented by, or incorporated in, ASICs (application-specific integrated circuits).

Particular embodiments of the subject matter have been described. Other embodiments are within the scope of the following claims. In some cases, the actions recited in the claims can be performed in a different order and still achieve desirable results.

What is claimed is:

1. A method for correcting the distortion of a first imaging optical unit of a first measurement system,
   wherein the first imaging optical unit has a first measurement accuracy and the method comprises the steps of:
   a) providing a first sample with first marks,
   b) measuring the positions of the first marks by use of a second measurement system comprising a second imaging optical unit, which has a second measurement accuracy that is better than the first measurement accuracy,
   c) establishing on the basis of the positions measured in step b) and predetermined intended positions of the first marks position errors of the first marks on the first sample produced during the manufacture of the first sample,
   d) measuring the positions of the first marks by use of the first measurement system,
   e) establishing the measurement error of the first imaging optical unit when determining the position of each first mark on the basis of the positions, the position errors established in step c) and the predetermined intended positions of the first marks, and
   f) taking account of the measurement error established in step e) for correcting the distortion in the case of a further measurement with the first measurement system.

2. The method as claimed in claim 1, wherein the first measurement system has a first image sensor with image pixels,
   wherein a measurement error value is established for each image pixel in step e).

3. The method as claimed in claim 1, wherein a first sample is provided in step a), in which the first marks are arranged in a regular grid, wherein at least one of the first marks has a form and/or orientation which, in conjunction with the other first marks, leads to the arrangement of the first marks not having translational invariance.

4. The method as claimed in claim 1, wherein all first marks are imaged simultaneously for the measurement in step b).

5. The method as claimed in claim 1, wherein all first marks are imaged simultaneously for the measurement in step d).

6. The method as claimed in claim 1, wherein, after carrying out step f), steps d) and e) are carried out again in order to establish the measurement error of the first imaging optical unit.

7. The method as claimed in claim 1, wherein, after carrying out step e), the following steps are carried out:
   g) measuring the positions of second marks of a second sample by use of the first measurement system,
   h) establishing on the basis of the positions of the second marks measured in step g), the measurement error established in step e) and predetermined intended positions of the second marks of the second sample position errors of the second marks on the second sample produced during the manufacture of the second sample.

8. The method as claimed in claim 7, including the following steps:
   i) measuring the positions of the second marks of the second sample by use of the first measurement system,
   j) establishing the measurement error of the first imaging optical unit when determining the position of each second mark on the basis of the positions measured in step i), the position errors established in step h) and the predetermined intended positions of the second marks.

9. A non-volatile computer-readable medium, having software code having instructions that when executed by a computing system cause the computing system to implement a process for correcting the distortion of a first imaging optical unit of a first measurement system,
   wherein the first imaging optical unit has a first measurement accuracy, and the process comprises the steps of:
   a) providing a first sample with first marks,
   b) measuring the positions of the first marks by use of a second measurement system comprising a second imaging optical unit, which has a second measurement accuracy that is better than the first measurement accuracy,
   c) establishing on the basis of the positions measured in step b) and predetermined intended positions of the first marks position errors of the first marks on the first sample produced during the manufacture of the first sample,
   d) measuring the positions of the first marks by use of the first measurement system,
   e) establishing the measurement error of the first imaging optical unit when determining the position of each first mark on the basis of the positions, the position errors established in step c) and the predetermined intended positions of the first marks, and
   f) taking account of the measurement error established in step e) for correcting the distortion in the case of a further measurement with the first measurement system.

10. The non-volatile computer-readable medium of claim 9 in which the first measurement system has a first image sensor with image pixels,
    wherein a measurement error value is established for each image pixel in step e).

11. The non-volatile computer-readable medium of claim 9, wherein a first sample is provided in step a), in which the first marks are arranged in a regular grid, wherein at least one of the first marks has a form and/or orientation which, in conjunction with the other first marks, leads to the arrangement of the first marks not having translational invariance.

12. The non-volatile computer-readable medium of claim 9, wherein all first marks are imaged simultaneously for the measurement in step b).

13. The non-volatile computer-readable medium of claim 9, wherein all first marks are imaged simultaneously for the measurement in step d).

14. The non-volatile computer-readable medium of claim 9, wherein, after carrying out step f), steps d) and e) are carried out again in order to establish the measurement error of the first imaging optical unit.

15. The non-volatile computer-readable medium of claim 9, wherein the process comprises, after carrying out step e), carrying out the following steps:
    g) measuring the positions of second marks of a second sample by use of the first measurement system,
    h) establishing on the basis of the positions of the second marks measured in step g), the measurement error established in step e) and predetermined intended positions of the second marks of the second sample position errors of the second marks on the second sample produced during the manufacture of the second sample.

16. The non-volatile computer-readable medium of claim 9 in which the process comprises the following steps:
  i) measuring the positions of the second marks of the second sample by use of the first measurement system,
  j) establishing the measurement error of the first imaging optical unit when determining the position of each second mark on the basis of the positions measured in step i), the position errors established in step h) and the predetermined intended positions of the second marks.

17. The method of claim 2 in which a first sample is provided in step a), in which the first marks are arranged in a regular grid, wherein at least one of the first marks has a form and/or orientation which, in conjunction with the other first marks, leads to the arrangement of the first marks not having translational invariance.

18. The method of claim 2 in which all first marks are imaged simultaneously for the measurement in step b).

19. The method of claim 2 in which all first marks are imaged simultaneously for the measurement in step d).

20. The method of claim 2 in which the process comprises, after carrying out step f), steps d) and e) are carried out again in order to establish the measurement error of the first imaging optical unit.

* * * * *